(12) United States Patent
Matsushita et al.

(10) Patent No.: US 12,259,044 B2
(45) Date of Patent: Mar. 25, 2025

(54) BUTTERFLY VALVE

(71) Applicant: ASAHI YUKIZAI CORPORATION, Nobeoka (JP)

(72) Inventors: Kotaro Matsushita, Nobeoka (JP); Kensuke Masuda, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 65 days.

(21) Appl. No.: 18/018,736

(22) PCT Filed: Jul. 29, 2021

(86) PCT No.: PCT/JP2021/028061
§ 371 (c)(1),
(2) Date: Jan. 30, 2023

(87) PCT Pub. No.: WO2022/025171
PCT Pub. Date: Feb. 3, 2022

(65) Prior Publication Data
US 2023/0323954 A1 Oct. 12, 2023

(30) Foreign Application Priority Data
Jul. 31, 2020 (JP) .................. 2020-131220

(51) Int. Cl.
*F16K 1/22* (2006.01)
*F16K 1/36* (2006.01)
*F16K 25/00* (2006.01)

(52) U.S. Cl.
CPC .............. *F16K 1/222* (2013.01); *F16K 1/36* (2013.01); *F16K 25/005* (2013.01)

(58) Field of Classification Search
None
See application file for complete search history.

(56) References Cited

U.S. PATENT DOCUMENTS

| | | | | |
|---|---|---|---|---|
| 1,858,587 A | * | 5/1932 | Grant | F16K 1/2268 251/306 |
| 2,883,149 A | * | 4/1959 | Fiorentini | F16K 1/226 251/308 |

(Continued)

FOREIGN PATENT DOCUMENTS

| | | |
|---|---|---|
| JP | S59-059576 U1 | 4/1984 |
| JP | S60-001475 A | 1/1985 |

(Continued)

OTHER PUBLICATIONS

PCT/ISA/210, "International Search Report for PCT International Application No. PCT/JP2021/028061," Oct. 19, 2021.

(Continued)

*Primary Examiner* — Matthew W Jellett
(74) *Attorney, Agent, or Firm* — HAUPTMAN HAM, LLP

(57) ABSTRACT

A butterfly valve includes a valve body, a valve stem rotatably supported by the valve body, a valve element rotatably supported by the valve body, and a bushing externally fitted around the valve stem. The valve element is configured by a core member and a contour member formed of a resin material and surrounding the core member to define a contour of the valve element, the valve element is formed with valve-stem holes that support the valve stem via the bushing, the contour member has a stem hole component forming inner peripheral surfaces of the valve-stem holes, and the bushing and the valve stem have shapes such that a gap is formed between an inner peripheral surface of a portion of the bushing located inside the stem hole component and an outer peripheral surface of a portion of the valve stem located inside the stem hole component.

4 Claims, 8 Drawing Sheets

(56) References Cited

U.S. PATENT DOCUMENTS

| | | | | |
|---|---|---|---|---|
| 3,051,435 | A | * | 8/1962 | Ramsey ................ F16K 1/2265 251/368 |
| 3,186,682 | A | * | 6/1965 | Pierson ................ F16K 1/2268 251/306 |
| 3,589,678 | A | * | 6/1971 | Magoon ................ F16K 1/2268 251/306 |
| 3,608,861 | A | * | 9/1971 | Helman ................ F16K 1/2285 251/173 |
| 3,675,888 | A | * | 7/1972 | Scaramucci .......... F16K 1/2265 249/95 |
| 4,111,395 | A | * | 9/1978 | Sheppard ............ F16K 31/1655 251/367 |
| 4,225,112 | A | * | 9/1980 | Libke ................... F16K 1/2265 384/903 |
| 4,225,113 | A | * | 9/1980 | Barthelemy .......... F16K 1/2265 251/306 |
| 4,273,308 | A | * | 6/1981 | Nakai .................... F16K 1/221 251/305 |
| 4,317,558 | A | * | 3/1982 | Sherlaw ................ F16K 1/2265 251/306 |
| 4,331,319 | A | * | 5/1982 | Summers .............. F16K 1/2266 251/173 |
| 4,358,086 | A | * | 11/1982 | Hiltebrand ............ F16K 1/2261 251/308 |
| 4,491,299 | A | * | 1/1985 | Summers .............. F16K 1/2263 251/308 |
| 5,673,895 | A | * | 10/1997 | Kaneko ............... F16K 27/0218 251/305 |
| 9,121,514 | B2 | * | 9/2015 | Blenkush .................. F16K 1/42 |
| 11,054,041 | B2 | * | 7/2021 | Matsushita .............. F16K 1/222 |
| 2012/0168659 | A1 | * | 7/2012 | Ozaki .................... F16K 1/2265 251/306 |
| 2019/0277408 | A1 | * | 9/2019 | Matsushita ............. F16K 1/222 |
| 2021/0172531 | A1 | | 6/2021 | Matsushita |

FOREIGN PATENT DOCUMENTS

| | | | | |
|---|---|---|---|---|
| JP | H09-303575 | A | | 11/1997 |
| JP | H10-169472 | A | | 6/1998 |
| JP | 2018-013165 | A | | 1/2018 |
| WO | WO-2018016538 | A1 | * | 1/2018 ............... F16K 1/22 |

OTHER PUBLICATIONS

Extended European Search Report of European Patent Application No. 21851030.3 dated Aug. 12, 2024, 8 pp.

* cited by examiner

BUTTERFLY VALVE

RELATED APPLICATIONS

The present application is National Phase of International Application No. PCT/JP2021/028061 filed Jul. 29, 2021, and claims priority from Japanese Application No. 2020-131220, filed Jul. 31, 2020, the disclosure of which is hereby incorporated by reference herein in its entirety.

TECHNICAL FIELD

The present invention relates to a butterfly valve including a valve element with a core member coated with a resin material.

BACKGROUND ART

Conventionally, in order to achieve both corrosion resistance and strength, butterfly valves including a valve element formed by coating a metal core member (insert) with a synthetic resin material that has excellent corrosion and chemical resistance are used in the field of using corrosive fluid and other fields. Such a butterfly valve is configured so that: a valve stem rotatably supported by bearing holes provided in a valve body passes through through-holes of a seat ring attached to the inner peripheral surface of an internal flow passage and is connected to a valve-stem hole provided in a valve element so as not to rotate; and the valve element is rotatably supported in the internal flow passage by the valve body. In order to prevent the fluid in the internal flow passage from leaking into the valve-stem hole of the valve element and the bearing holes of the valve body, the butterfly valve is provided with seal parts at multi stages, including a seal part between a portion surrounding the valve-stem hole on the outer edge portion of the valve element and a portion surrounding the through-holes on the valve seat surface of the seat ring, a seal part formed by a contact between the outer peripheral surface of the valve stem and the inner peripheral surface of the through-holes of the seat ring, and a seal part between the outer peripheral surface of the valve stem and the inner peripheral surfaces of the bearing holes and the valve-stem hole.

In a butterfly valve, when the valve is closed, the pressure of the fluid in the internal flow passage acts on the valve element, thereby pushing the valve element toward the secondary side (downstream). As a result, the valve stem connected to the valve element is urged to move toward the secondary side. On the other hand, it is typical that the bearing holes of the valve body have an inner diameter slightly larger than the outer diameter of the valve stem, in order to absorb machining errors of the valve stem and the bearing holes and prevent seizure of the valve stem, and are formed to have a gap between the inner peripheral surface of the bearing hole and the outer peripheral surface of the valve stem. Therefore, when the fluid pressure acts on the valve element, the valve stem moves toward the secondary side together with the valve element by the distance of this gap. There is a problem that this movement of the valve stem makes the through-holes in the seat ring be deformed, so that the fluid easily leaks from the gap created. There is another problem that it is difficult to provide sealing between the outer peripheral surface of the rotating valve stem and the inner peripheral surfaces of the bearing holes of the stationary valve body or the through-holes of the stationary seat ring.

To deal with such problems, as described in PTL1 and PTL2, for example, a butterfly valve is proposed, in which a bushing extending from a bearing hole of a valve body to a valve-stem hole of a valve element is rotatably fitted around the valve stem to rotatably support the valve stem in the bearing hole and the valve-stem hole through the bushing, and a sealing member such as an O-ring is provided on the outer peripheral surface of the bushing, thus providing sealing between the outer peripheral surface of the valve stem, and the inner peripheral surfaces of the bearing hole of the valve body, the through-holes of the seat ring and the valve stem hole of the valve element.

CITATION LIST

Patent Literature

PTL1: Japanese Unexamined Patent Publication No. S60-1475
PTL2: Japanese Unexamined Patent Publication No. H9-303575

SUMMARY OF THE INVENTION

Technical Problem

In some cases where a butterfly valve, as described above, provided with a valve element formed by covering a metal core member with a synthetic resin material and having a valve stem supported in bearing holes and a valve-stem hole via a bushing is used in a pipeline for corrosive liquids, the valve stem may be connected to the core member in order to suppress breakage of the valve element when a large fluid pressure acts on the valve element in closing the valve. Further, since corrosive liquid is handled, it is desirable that even if the sealing around the valve stem between the outer peripheral edge portion of the valve element and the valve seat surface of the seat ring is broken due to wearing of the sealing part around the valve stem, the liquid leaking from the internal flow passage into the valve-stem hole can be prevented from coming in contact with the metal core member of the valve element. That is, it is desirable that the butterfly valve has a configuration where the core member is completely covered with a synthetic resin material so that the core member is not exposed to the outside. For this purpose, it is required that: the inside part of the valve-stem hole is constituted by the core member; the valve stem is fixed to the part of the valve-stem hole configured by the core member so as not to rotate; and the outside part of the valve-stem hole is formed of synthetic resin only. In this way, it is necessary to have no core member existing around the opening of the valve-stem hole facing the outer periphery of the valve element. With this configuration, the surrounding of the opening of the valve-stem hole is formed only by synthetic resin material, and the portion surrounding the opening of the valve-stem hole in the valve element is not reinforced.

On the other hand, when the valve element is pushed to the secondary side by the fluid pressure acting on the valve element in closing the valve, a bending moment is generated in the valve element, so that a reaction force from the valve stem is transmitted via the bushing to the inner peripheral surface of the valve-stem hole that supports the valve stem. However, since there is no core member for reinforcement provided at the portion surrounding the opening of the valve-stem hole, the reaction force acting on the valve element from the valve stem via the bushing must be received only by the resin material portion. As a result, there arises a problem that if a large pressure acts on the valve element from the fluid in closing the valve, the portion surrounding the opening of the valve-stem hole of the valve element is likely to be damaged by the reaction force from the valve stem.

Accordingly, it is an object of the present invention to solve the problems existing in the prior art and to provide a butterfly valve including a valve element with a core member covered with a resin material, which can prevent fluid pressure acting on the valve element in closing the valve from being transmitted to the valve stem from the vicinity of an opening of a valve-stem hole of the valve element formed of resin material only, thereby suppressing a breakage of the valve element due to the reaction force from the valve stem.

Solution to Problem

In view of the above-described object, the present invention provides a butterfly valve includes a valve body formed therein with an internal flow passage, a valve stem rotatably supported by the valve body, a valve element placed in the internal flow passage and rotatably supported by the valve body via the valve stem, and a bushing externally fitted around the valve stem, in which the valve element is configured by a core member and a contour member formed of a resin material, the contour member surrounding the core member to define a contour of the valve element, the valve element formed with a valve-stem hole that supports at least a part of the valve stem via the bushing; the contour member has a stem hole component forming at least a portion of an inner peripheral surface of the valve-stem hole; and the bushing and the valve stem have shapes such that a gap is formed between an inner peripheral surface of a portion of the bushing located inside the stem hole component and an outer peripheral surface of a portion of the valve stem located inside the stem hole component.

In the above-described butterfly valve, the valve element is configured by the core member and the contour member made of resin and surrounding the core member, the valve stem supported by the valve body is supported, via the bushing, in the stem hole component of the valve-stem hole of the valve element that is a part of the contour member, and there is the gap formed between the inner peripheral surface of the portion of the bushing located inside the stem hole component and the outer peripheral surface of the portion of the valve stem located inside the stem hole component. When the butterfly valve is closed, fluid pressure acts on the valve element to make the valve element move to the secondary side (downstream), thereby generating bending moment in the valve element connected to the valve stem. When the inner peripheral surface of the bushing and the outer peripheral surface of the valve stem are in contact with each other, the reaction force from the valve stem is transmitted via the bushing to the inner peripheral surface of the valve-stem hole which supports the valve stem. The portion surrounding the opening of the valve-stem hole is formed by the stem hole component formed solely of resin material, so that the stem hole component is easily damaged due to the fluid pressure that the valve element receives in closing the valve. However, the butterfly valve according to the present invention is configured to have the gap formed between the inner peripheral surface of the portion of the bushing located inside the stem hole component (specifically, inside the valve-stem hole of the stem hole component) and the outer peripheral surface of the portion of the valve stem located inside the stem hole component (specifically, inside the valve-stem hole of the stem hole component). Therefore, when fluid pressure acts on the valve element in closing the valve to generate bending moment in the valve element, the gap between the outer peripheral surface of the valve stem and the inner peripheral surface of the bushing serves as an escape allowance in the stem hole component, thereby avoiding a contact between the outer peripheral surface of the stem and the inner peripheral surface of the bushing and preventing transmission of force from the valve element to the valve stem, so that the reaction force is not transmitted from the bushing to the stem hole component.

Preferably, in the above-described butterfly valve, there is an annular neck portion provided on an outer periphery of the portion of the valve stem located inside the stem hole component, and the gap between the inner peripheral surface of the bushing and the outer peripheral surface of the valve stem is formed in the stem hole component by the neck portion.

Preferably, the neck portion is formed to extend over an entire region of an outer periphery of a portion of the valve stem along the axis of rotation, the portion of the valve stem facing a region where the inner peripheral surface of the valve-stem hole and the outer peripheral surface of the bushing are in contact with each other in the stem hole component.

In one embodiment, the core member may include tubular stem-hole reinforcement portions at both ends in the direction of the rotation axis, and each of the stem-hole reinforcement portions may be spaced apart from the inner peripheral surface of the valve-stem hole of the stem hole component so as to surround the valve-stem hole.

Advantageous Effect of the Invention

According to the present invention, the butterfly valve is constituted so that the valve element is configured by the core member and the contour member made of resin and surrounding the core member, the valve stem supported by the valve body is supported, via the bushing, in the stem hole component of the valve-stem hole of the valve element that is a part of the contour member, and there is the gap formed between the inner peripheral surface of the portion of the bushing located inside the stem hole component and the outer peripheral surface of the portion of the valve stem located inside the stem hole component. Therefore, when fluid pressure acts on the valve element in closing the valve to generate bending moment in the valve element, the gap between the outer peripheral surface of the valve stem and the inner peripheral surface of the bushing serves as an escape allowance in the stem hole component, thereby avoiding a contact between the outer peripheral surface of the stem and the inner peripheral surface of the bushing and preventing transmission of force from the valve element to the valve stem, so that the reaction force is not transmitted from the bushing to the stem hole component. As a result, the butterfly valve achieves the effect of suppressing breakage of the stem hole component, that is, the resin material portion in the vicinity of the opening of the valve-stem hole.

DESCRIPTION OF EMBODIMENTS

While an embodiment of a butterfly valve 11 according to the present invention will be described below with reference to the drawings, it goes without saying that the present invention should not be limited to the embodiment.

Figure 1:
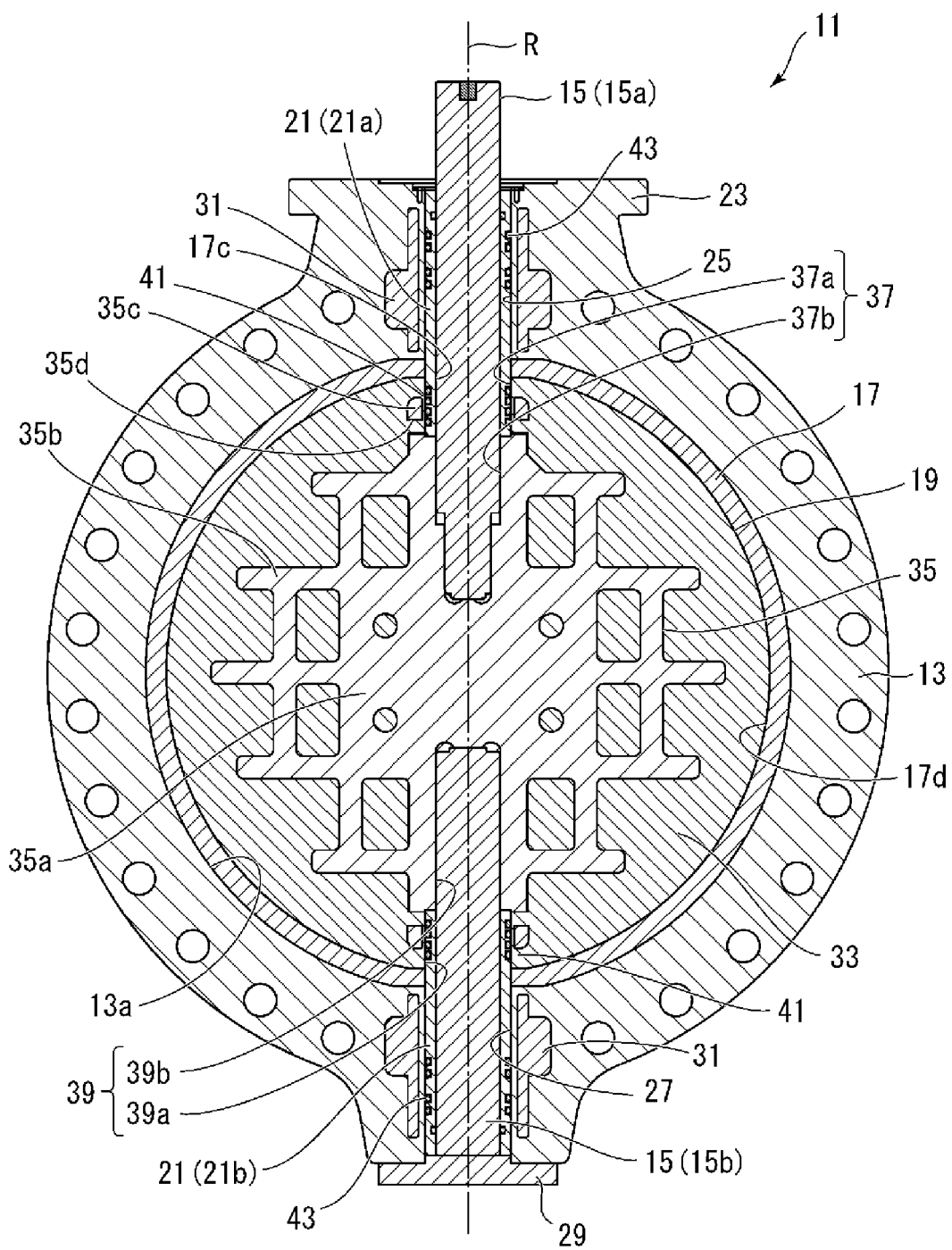
FIG. 1 is a vertical cross-sectional view of a butterfly valve as viewed from the axis direction of the flow passage, and shows the valve closed state.
Figure 2:
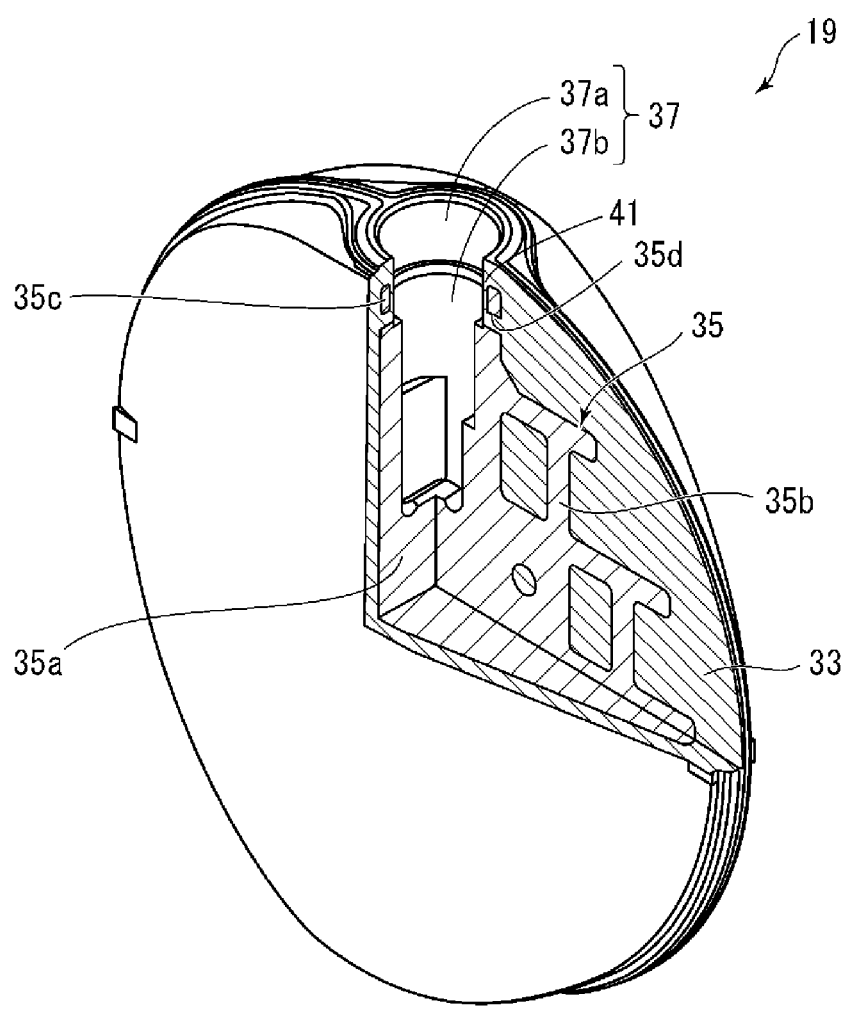
FIG. 2 is a partial cross-sectional perspective view, showing the valve element of the butterfly valve shown in FIG. 1.

First, an overall configuration of the butterfly valve 11 will be described with reference to FIGS. 1 and 2. FIG. 1 is a longitudinal cross-sectional view of the butterfly valve as viewed from a direction of a flow passage axis, and shows a valve closed state. FIG. 2 is a partial cross-sectional perspective view, showing a valve element of the butterfly valve shown in FIG. 1 that is partially broken to be shown in section.

The butterfly valve 11 is provided with a substantially hollow cylindrical valve body 13 formed therein with an internal flow passage 13a extending in a direction of a flow passage axis, a valve stem 15 rotatably supported by the valve body 13, an annular seat ring 17 attached to the inner periphery of the internal flow passage 13a, a valve element 19 placed in the internal flow passage 13a and connected to the valve stem 15 so that the valve element 19 is supported by the valve body 13 to be rotatable about a rotation axis R, and a bushing 21 made of a synthetic resin material and rotatably fitted around the valve stem 15. The butterfly valve 11 is configured so that the internal flow passage 13a can be closed and opened by bringing a valve seat part 17d formed on an inner peripheral surface of the seat ring 17 and an outer peripheral edge portion of the valve element 19 into and out of contact with each other.

In the shown embodiment of the butterfly valve 11, the valve stem 15 is configured by a first valve stem 15a arranged on an upper side in FIG. 1 along the rotation axis R and a second valve stem 15b arranged on a lower side in FIG. 1, and the bushing 21 is also configured by a first bushing 21a rotatably fitted around the first valve stem 15a and a second bushing 21b rotatably fitted around the second valve stem 15b. The valve element 19 is supported by the first valve stem 15a and the second valve stem 15b via the first bushing 21a and the second bushing 21b, respectively, to be rotatable relative to the valve body 13. There is a driving unit (not shown) connected to the first valve stem 15a, and the driving unit is used to rotate the first valve stem 15a, thereby rotating the valve element 19 about the rotation axis R to open and close the valve. In the shown embodiment, the valve stem 15 is configured by two valve stems 15, that is, the first valve stem 15a and the second valve stem 15b. However, the first valve stem 15a and second valve stem 15b may be integrally formed to be a single valve stem 15. Similarly, the first bushing 21a and second bushing 21b may be integrally formed to be a single bushing 21. The first valve stem 15a and second valve stem 15b are formed of metal materials such as cast iron, steel, carbon steel, copper, copper alloys, brass, stainless steel, aluminum, and titanium, but the materials of the first stem 15a and second valve stem 15b are not particularly limited as long as they pose no problems in terms of strength.

The valve body 13 is formed of a synthetic resin material. Examples of synthetic resin materials which can be used for the valve body 13 include polyvinyl chloride (PVC), polypropylene (PP), polyvinylidene fluoride (PVDF), polyethylene (PE), polyphenylene sulfide (PPS), polydicyclopentadiene (PDCPD), polytetrafluoroethylene (PTFE), acrylonitrile butadiene styrene resin (ABS resin), chlorinated polyvinyl chloride (PVC-C), perfluoroalkoxyalkane (PFA), polydicyclopentadiene (PDCPD), fiber reinforced plastic (FRP) and these synthetic resin materials reinforced with glass fibers. The valve body 13 has a substantially disk-shaped top flange 23 at the top thereof. The valve body 13 has a first bearing hole 25 and a second bearing hole 27 which are opposed to each other in a radial direction (a vertical direction in FIG. 1) of the internal flow passage 13a and extend from the internal flow passage 13a to the outside.

The first bearing hole 25 extends through the top flange 23. The first valve stem 15a, around which the first bushing 21a is fitted, is inserted into the first bearing hole 25, so that the first valve stem 15a is rotatably supported in the first bearing hole 25 via the first bushing 21a. The upper end of the first valve stem 15a inserted into the first bearing hole 25 protrudes from the top flange 23 to be able to be connected to the driving unit placed above the top flange 23. Examples of the driving unit which can be used include lever-type, gear-type, and automatic drivers. The lower ends of the first valve stem 15a and the first bushing 21a inserted into the first bearing hole 25 extend out of the first bearing hole 25 to protrude into the internal flow passage 13a. Similarly, the second valve stem 15b, around which the second bushing 21b is fitted, is inserted in the second bearing hole 27, so that the second valve stem 15b is rotatably supported in the second bearing hole 27 via the second bushing 21b. The second bearing hole 27 is closed at the lower end thereof by a valve stem holder 29, so that the lower ends of the second valve stem 15b and the second bushing 21b inserted into the second bearing hole 27 abut on the valve stem holder 29. The upper ends of the second valve stem 15b and the second bushing 21b inserted into the second bearing hole 27 extend out of the second bearing hole 27 to protrude into the internal flow passage 13a.

The interior of the valve body 13 includes reinforcing metal insert members 31 spaced apart from and surrounding the first bearing hole 25 and the second bearing hole 27. Stainless steel for casting is used as the metal material for forming the insert members 31, but a material used for the insert members 31 is not limited to this. The insert members 31 may be formed of other metal materials similar to those of the valve stem 15 or non-metallic materials as long as the materials have higher mechanical strength than the valve body 13.

In the embodiment shown in FIG. 1, each of the insert members 31 has a substantially tubular shape. Specifically, each insert member 31 has a central portion of a substantially rectangular parallelepiped shape, a column portion positioned farther from the internal flow passage 13a than the central portion, and a base portion positioned closer to the internal flow passage 13a than the central portion and being larger than the column portion and smaller than the central portion. The insert member 31 has a through-hole having a diameter larger than the first bearing hole 25 and the second bearing hole 27 and formed in the center of the column portion, the central portion, and the base portion. The central portion is formed to have a bolt hole for screwing with a bolt to connect the valve body 13 with a pipe. These insert members 31 of such a shape are spaced radially outward of the first and second bearing holes 25 and 27. These insert members 31 are embedded in the valve body 13 so as not to be exposed in the first bearing hole 25 and the second bearing hole 27, because this prevents the metal insert members 31 from coming into contact with corrosive fluid that might flow into the first bearing hole 25 and the second bearing hole 27.

For instance, the seat ring 17 is formed of elastic materials such as ethylene propylene rubber (EPDM), chloroprene rubber (CR), isoprene rubber (IR), chlorosulfonated rubber (CSM), nitrile rubber (NBR), styrene-butadiene rubber (SBR), chlorinated polyethylene (CM), fluororubber (FKM), hydrogenated acrylonitrile butadiene rubber (HNBR), urethane rubber (U), silicone rubber (VMQ, FVMQ), ethylene propylene rubber (EPM), acrylic rubber (ACM), and butyl rubber (IIR), and these elastic materials coated with fluororesin. These elastic materials are just examples, and the materials are not particularly limited as long as they pose no problems in terms of strength and corrosion resistance in use. The seat ring 17 includes a ring body 17a having a substantially tubular shape and extending in a direction of a center axis, and flange portions 17b opposed to each other and extending outward from opposite ends of the ring body 17a in the direction of the center axis (see FIG. 3). The seat ring 17 is formed, at positions opposed to each other in the radial direction of the ring body 17a, with a pair of through-holes 17c and 17c for allowing the first valve stem 15a and the second valve stem 15b to pass therethrough. The ring body 17 is formed on the inner peripheral surface thereof with a valve seat part 17d extending annually, and the outer peripheral edge portion of the valve element 19 comes in contact with the valve seat part 17d, thereby providing sealing between the inner peripheral surface of the seat ring 17 and the outer peripheral edge portion of the valve element 19 to be able to close the internal flow passage 13a with the valve element 19.

The valve element 19 is placed inside the seat ring 17 attached to the inner peripheral surface of the internal flow passage 13a of the valve body 13. The valve element 19 is an integral piece including a contour member 33 formed of a synthetic resin material and having a substantially disk-shaped outer shape, and a core member 35 formed of a metal material and surrounded by the contour member 33. The valve element 19 in this embodiment is molded by injecting a synthetic resin material, which forms the contour member 33, into a mold for injection molding with the core member 35 placed inside in advance. In this embodiment, PVDF, which has high chemical resistance, is used as the synthetic resin material forming the contour member 33, but the material used for the contour member 33 is not limited to this, and other synthetic resin materials such as PP, PVC, PE, PFA, and PDCPD can be used. Further, in the present embodiment, an aluminum alloy for casting is used as the metal material for forming the core member 35, but the material used for the core member 35 is not limited to this, and the core member 35 may be formed of other metal materials similar to the valve stem or from non-metal materials, as long as they have higher mechanical strength than the contour member 33.

The valve element 19 has a first valve-stem hole 37 and a second valve-stem hole 39 provided in the outer peripheral portion thereof at opposing positions along the rotation axis R so as to be formed coaxially with the rotation axis R. When the first valve stem 15a and the second valve stem 15b are formed integrally so that the valve stem 15 is a single valve stem 15, the first valve-stem hole 37 and the second valve-stem hole 39 are also formed as a single through-hole.

The first valve-stem hole 37 includes a first large-diameter hole portion 37a of a relatively larger diameter including an open end (opening to the internal flow passage 13a), and a first small-diameter hole portion 37b of a relatively smaller diameter extending inward from the first large-diameter hole portion 37a in the direction of the rotation axis R. The inner peripheral surface of the first large-diameter hole portion 37a is formed by the contour member 33, while the inner peripheral surface of the first small-diameter hole portion 37b is formed by the core member 35. The first valve stem 15a and the first bushing 21a extending from the first bearing hole 25 of the valve body 13 through the through-hole 17c of the seat ring 17 and protruding from the through-hole 17c are inserted into the first valve-stem hole 37, so that the first large-diameter hole portion 37a of the first valve-stem hole 37 supports the first valve stem 15a via the first bushing 21a. The first bushing 21a is not inserted into the first small-diameter hole portion 37b, and the portion of the first valve stem 15a located on the distal end side (hereinafter referred to as the distal end portion) is directly inserted into the first small-diameter hole portion 37b, so that the distal end portion of the first valve stem 15a is fitted into the first small-diameter hole portion 37b so as not to be rotatable about the rotation axis R. For instance, the distal end portion of the first valve stem 15a and the first small-diameter hole portion 37b may be formed to have complementary polygonal or circular two-chamfered shapes, whereby the distal end portion of the first valve stem 15a and the first small-diameter hole portion 37b can be fitted together so as not to be rotatable. However, the method of fitting the first valve stem 15a and the first small-diameter hole portion 37b is not limited as long as the distal end portion of the first valve stem 15a and the first small-diameter hole portion 37b can be fitted so as not to be rotatable. Note that the first bushing 21a is not inserted into the first small-diameter hole portion 37b and therefore only the inner peripheral surface of the first large-diameter hole portion 37a is the area which comes in contact with the outer peripheral surface of the first bushing 21a.

As in the first valve-stem hole 37, the second valve-stem hole 39 includes a second large-diameter hole portion 39a of a relatively larger diameter including an open end (opening to the internal flow passage 13a), and a second small-diameter hole portion 39b of a relatively smaller diameter extending inward from the second large-diameter hole portion 39a in the direction of the rotation axis R. The inner peripheral surface of the second large-diameter hole portion 39a is formed by the contour member 33, while the inner peripheral surface of the second small-diameter hole portion 39b is formed by the core member 35. The second valve stem 15b and the second bushing 21b extending from the second bearing hole 27 of the valve body 13 through the through-hole 17c of the seat ring 17 and protruding from the through-hole 17c are inserted into the second valve-stem hole 39, so that the second large-diameter hole portion 39a of the second valve-stem hole 39 supports the second valve stem 15b via the second bushing 21b. The second bushing 21b is not inserted into the second small-diameter hole portion 39b, and the portion of the second valve stem 15b located on the distal end side (hereinafter referred to as the distal end portion) is directly inserted into the second small-diameter hole portion 39*b* to be fitted therein. The second bushing 21*b* is not inserted into the second small-diameter hole portion 39*b*, and therefore only the inner peripheral surface of the second large-diameter hole portion 39*a* is the area which comes in contact with the outer peripheral surface of the second bushing 21*b*. The second small-diameter hole portion 39*b* has a circular cross-sectional shape because rotational torque does not need to be transmitted between the second small-diameter hole portion 39*b* and the second valve stem 15*b*, and the second small-diameter hole portion 39*b* differs from the first small-diameter hole portion 37*b* of the first valve-stem hole 37 in this respect. However, the second small-diameter hole portion 39*b* may have the same configuration as the first small-diameter hole portion 37*b*.

In the following description, the contour member 33, which surrounds the first large-diameter hole portion 37*a* and the second large-diameter hole portion 39*a* to form the inner peripheral surfaces of the first large-diameter hole portion 37*a* and the second large-diameter hole portion 39*a*, may be specially described as a "stem hole component 41".

As described above, the first valve-stem hole 37 and the second valve-stem hole 39 have a similar configuration, except that the cross-sectional shapes of the first small-diameter hole portion 37*b* and the second small-diameter hole portion 39*b* are different. Thus, in the following description, the first valve-stem hole 37 will be mainly described as a representative of the first valve-stem hole 37 and the second valve-stem hole 39. For the valve stem, the first valve stem 15*a* will be described as a representative, and for the bushing, the first bushing 21*a* will be described as a representative. The descriptions of the first valve stem 15*a*, the first bushing 21*a*, and the first valve-stem hole 37 similarly apply to the second valve stem 15*b*, the second bushing 21*b*, and the second valve-stem hole 39. Furthermore, for the sake of brevity of description, the "first" for each element may be omitted. This does not apply if it is necessary to distinguish between "first" and "second".

In this embodiment, the bushing 21 (the first bushing 21*a* and the second bushing 21*b*) is made of PVDF, which has high resistance to corrosive fluid. A plurality of sealing members 43 such as O-rings are provided on the outer peripheral surface of the bushing 21*a* to prevent fluid from entering the interior of the valve element 19 and prevent fluid from coming in contact with the valve stem 15. In the embodiment shown in FIG. 1, four sealing members 43 are placed on the portion of the bushing 21*a* that is inserted into the large-diameter hole portion 37*a* of the valve-stem hole 37.

The core member 35 includes a central portion 35*a* and a substantially lattice-shaped main reinforcement portion 35*b* that is provided laterally (left-right) symmetrically around the central portion 35*a*. Substantially tubular (preferably substantially cylindrical) stem-hole reinforcement portions 35*c*, 35*c* are provided at the upper end and the lower end of the central portion 35*a*. In the shown embodiment, the stem-hole reinforcement portions 35*c*, 35*c* include substantially rectangular parallelepiped portions at the upper and lower ends of the central portion 35*a*, where holes with diameters larger than the first and second valve-stem holes 37 and 39 are formed in these rectangular parallelepiped portions. Preferably, the stem-hole reinforcement portions 35*c* and the central portion 35*a* have the same outer shape. These stem-hole reinforcement portions 35*c* each extend into the stem hole component 41 making up the large-diameter hole portion 37*a*, and surround at least a part of the radially outer side of the large-diameter hole portion 37*a* in the direction of the rotation axis to reinforce the stem hole component 41 formed of a resin material. When the large-diameter hole portion 37*a* supports the shear force and bending moment generated in the valve element 19 due to the fluid pressure acting on the valve element 19, the stem-hole reinforcement portion 35*c* supports the force acting on the large-diameter hole portion 37*a* and the stem hole component 41 from the valve stem 15, thereby suppressing deformation of the stem hole component 41. As a result, the sealing provided by the sealing members 43 between the inner peripheral surface of the large-diameter hole portion 37*a* and the outer peripheral surface of the bushing 21*a* can be kept reliably. As shown in FIGS. 1 and 2, preferably, the stem-hole reinforcement portions 35*c* are formed with a plurality of through-holes 35*d* penetrating through the inner peripheral surface and the outer peripheral surface of the stem-hole reinforcement portions 35*c*. These through-holes 35*d* function as passages for the synthetic resin material forming the stem hole component 41 when the contour member 33 is manufactured by injection molding while placing the core member 35 in a mold, thereby suppressing occurrence of injection molding failure.

Further, the stem-hole reinforcement portions 35*c* surround the radially outer sides of the first valve-stem hole 37 and the second valve-stem hole 39, and are spaced apart from the inner peripheral surfaces of the first valve-stem hole 37 and the second valve-stem hole 39. The stem-hole reinforcement portions 35*c* thus are configured to be embedded in the stem hole component 41 so as not to be exposed to the insides of the first valve-stem hole 37 and the second valve-stem hole 39. This is because the stem-hole reinforcement portions 35*c*, 35*c* made of metal could be prevented from coming in contact with corrosive liquid even if the corrosive liquid flows into the first large-diameter hole portion 37*a* of the first valve-stem hole 37 and the second large-diameter hole portion 39*a* of the second valve-stem hole 39.

Next, referring to FIGS. 3 to 8, structures of supporting portions where the valve body 13 and the valve element 19 support the valve stem 15 will described in detail.

Figure 3:
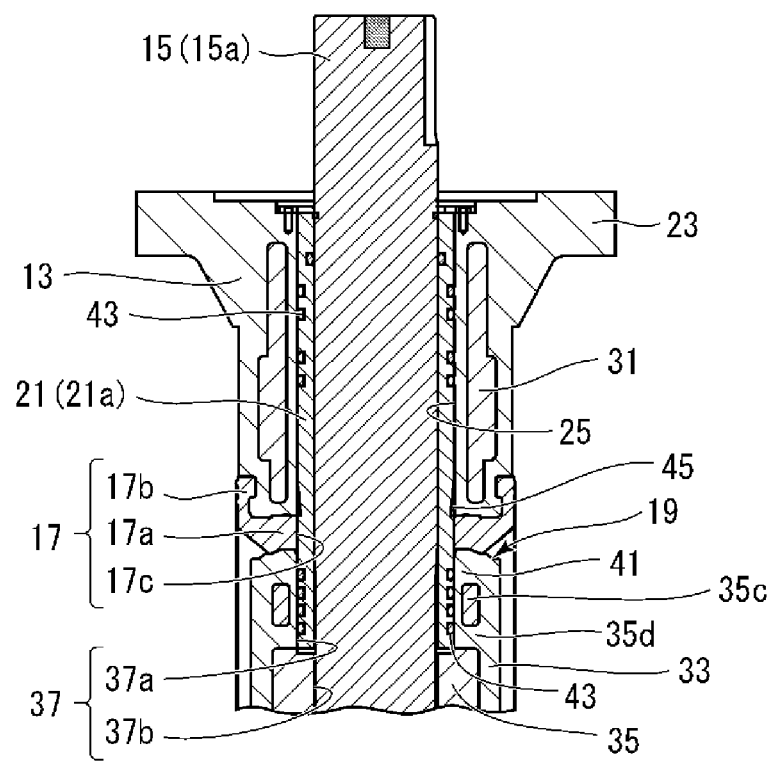
FIG. 3 is a partial cross-sectional view, showing the bearing portion of the valve body that supports the valve stem in the butterfly valve shown in FIG. 1.

First, referring to FIGS. 3 and 4, the details of the structure of the supporting portion where the valve body 13 supports the valve stem 15 in the butterfly valve 11 shown in FIG. 1 will be described.

In the butterfly valve 11, the first bearing hole 25 and the first bushing 21*a* are configured to have shapes such that a gap (space) is formed between the inner peripheral surface of the first bearing hole 25 and the outer peripheral surface of the first bushing 21*a* in a region adjacent to the opening where the first bearing hole 25 supporting the first valve stem 15*a* is opened to the internal flow passage 13*a*. In one embodiment shown in FIGS. 3 and 4, there is an annular gap (space) formed between the inner peripheral surface of the first bearing hole 25 and the outer peripheral surface of the first bushing 21*a* by forming a thickness reduction part in the region adjacent to the opening of the first bearing hole 25 on the outer peripheral surface of the first bushing 21*a* to provide a circumferentially extending annular neck portion 45 on the outer peripheral surface of the first bushing 21*a*. However, there may be a gap formed between the inner peripheral surface of the first bearing hole 25 and the outer peripheral surface of the first bushing 21*a* by forming a thickness reduction part on the inner peripheral surface of the first bearing hole 25 to provide a circumferentially extending annular neck portion 45 in a region adjacent to the opening of the first bearing hole 25 on the inner peripheral surface of the first bearing hole 25, and the method for forming a gap between the inner peripheral surface of the first bearing hole 25 and the outer peripheral surface of the first bushing 21a is not particularly limited. Note that when the neck portion 45 is provided on the inner peripheral surface of the first bearing hole 25, the perimeter of the first bearing hole 25 that supports bending moment becomes thinner, which may reduce the strength. Therefore, it is preferable that the neck portion 45 is provided on the outer peripheral surface of the first bushing 21a, which is easier to machine than the first bearing hole 25 of the valve body 13.

When the butterfly valve 11 is closed, fluid pressure acts on the valve element 19 to make the valve element 19 move to the secondary side (downstream), thereby generating bending moment in the first valve stem 15a fixed to the valve element 19, and the first bearing hole 25 tries supporting the force due to this bending moment via the first bushing 21a. At this time, if the inner peripheral surface of the first bearing hole 25 is in contact with the outer peripheral surface of the first bushing 21a, stress concentrate will occur near the portion of the first bearing hole 25 adjacent to the opening. In addition, due to the wear of the seat ring 17 and other reasons, the fluid in the internal flow passage 13a may break the sealing between the area of the valve seat part 17d surrounding the through-hole 17c of the seat ring 17 and the area of the outer peripheral edge portion surrounding the first valve-stem hole 37 of the valve element 19 and sealing between the inner peripheral surface of the through-hole 17c of the seat ring 17 and the outer peripheral surface of the first bushing 21a, and leak into the first bearing hole 25 and the space between the outer peripheral surface of the seat ring 17 and the inner peripheral surface of the internal flow passage 13a. In order to prevent the fluid in the internal flow passage 13a from coming in contact with the metal insert member 31 even in such a case, the insert member 31 is covered with the synthetic resin material of the valve body 13 so as not to be exposed to the outside, and is spaced apart from the inner peripheral surface of the first bearing hole 25 and the inner peripheral surface of the internal flow passage 13a of the valve body 13. That is, the insert member 31 does not exist in the vicinity of the opening of the first bearing hole 25, and the vicinity of the opening of the first bearing hole 25 is formed only of the synthetic resin material. As a result, the first bearing hole 25 may fail to withstand the force due to bending moment transmitted from the first valve stem 15a via the first bushing 21a, and may be damaged.

However, in the butterfly valve 11, there is a gap (space) formed between the inner peripheral surface of the first bearing hole 25 and the outer peripheral surface of the first bushing 21a in the region adjacent to the opening of the first bearing hole 25, as described above. Therefore, even when fluid pressure acts on the valve element in closing the valve so that the first valve stem 15a applies a force due to bending moment to the first bearing hole 25 via the first bushing 21a, the gap between the inner peripheral surface of the first bearing hole 25 and the outer peripheral surface of the first bushing 21a in the region adjacent to the opening of the first bearing hole 25 serves as an escape allowance, thereby avoiding a contact between the outer peripheral surface of the first bushing 21a and the inner peripheral surface of the first bearing hole and preventing transmission of force due to bending moment from the outer peripheral surface of the first bushing 21a to the inner peripheral surface of the first bearing hole 25. As a result, the butterfly valve 11 can suppress breakage of the resin material portion in the vicinity of the opening of the first bearing hole 25 of the valve body 13.

When the valve element 19 receives action of fluid pressure and the first bearing hole 25 supports the bending moment from the first valve stem 15a, the fulcrum is on the side opposite to the internal flow passage 13a, so that the displacement of the first valve stem 15a from the rotation axis R becomes larger as closer to the internal flow passage 13a. Therefore, it is preferable that the size of the gap (space) between the inner peripheral surface of the first bearing hole 25 and the outer peripheral surface of the first bushing 21a, that is, the depth of the neck portion 45 is tapered so that the depth of the neck portion 45 becomes larger as closer to the opening of the first bearing hole 25 to the internal flow passage 13a. This can minimize the amount of thickness reduction.

If the size of the gap (space) between the inner peripheral surface of the first bearing hole 25 and the outer peripheral surface of the first bushing 21a, that is, the depth of the neck portion 45, is too large, this will permit the deformation (i.e., curving) of the first valve stem 15a and accordingly increases the displacement of the valve element 19, so that the sealability at the valve seat will deteriorate. Therefore, the gap, that is, the amount of thickness reduction in the neck portion 45 is preferably adjusted to the extent that the force due to bending moment is not transmitted even when the valve element 19 is displaced in receiving pressure from the fluid.

Figure 4:
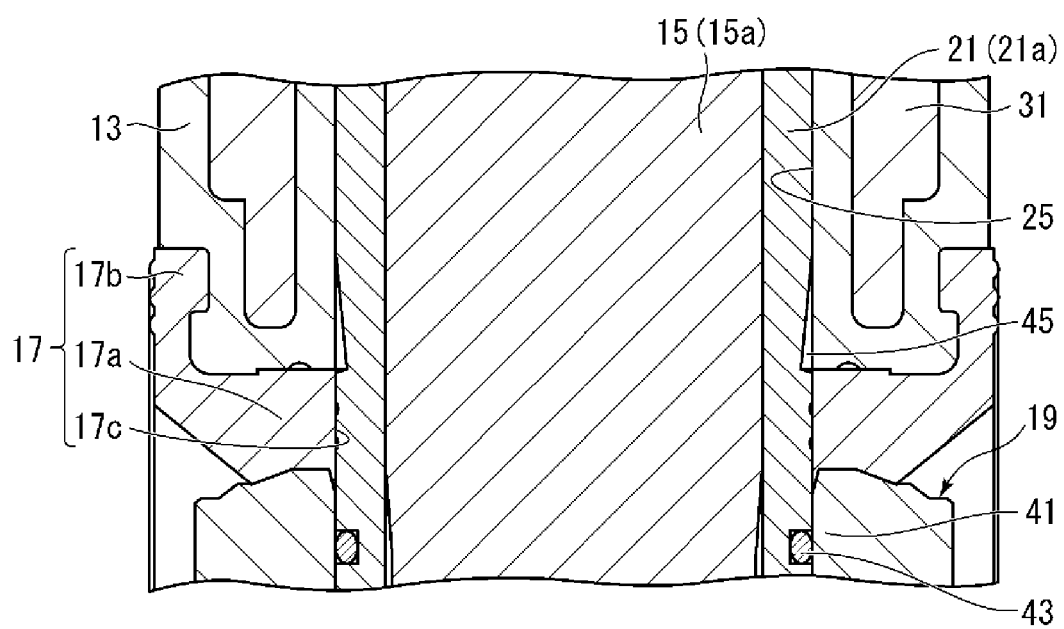
FIG. 4 is a partially enlarged cross-sectional view of the bearing portion of the valve body shown in FIG. 3, enlarging the vicinity of the opening.

As well shown in FIG. 4, in the butterfly valve 11, the insert member 31 extends to a position radially outward of at least part of the neck portion 45 in the direction of the rotation axis R. By configuring the insert member 31 to extend in the direction of the rotation axis R to the vicinity of the opening of the first bearing hole 25 in this way, the strength of the portion surrounding the opening of the first bearing hole 25 is enhanced, so that the first bearing hole 25 can withstand the force due to bending moment acting thereon from the first valve stem 15a via the first bushing 21a even when a large fluid pressure acts on the valve element 19. In order to enhance the strength of the first bearing hole 25, it is preferable to make the thickness of the insert member 31 as large as possible.

Similarly, the second bearing hole 27 and the second bushing 21b in the butterfly valve 11 are also configured so that an annular gap (space) is formed between the inner peripheral surface of the second bearing hole 27 and the outer peripheral surface of the second bushing 21b in the region adjacent to the opening where the second bearing hole 27 for supporting the second valve stem 15b is opened to the internal flow passage 13a. The configuration and action of the second bearing hole 27, the second bushing 21b and their surroundings are similar to the configuration and action of the first bearing hole 25, the first bushing 21a and their surroundings described above, and the descriptions thereof are omitted here.

Figure 5:
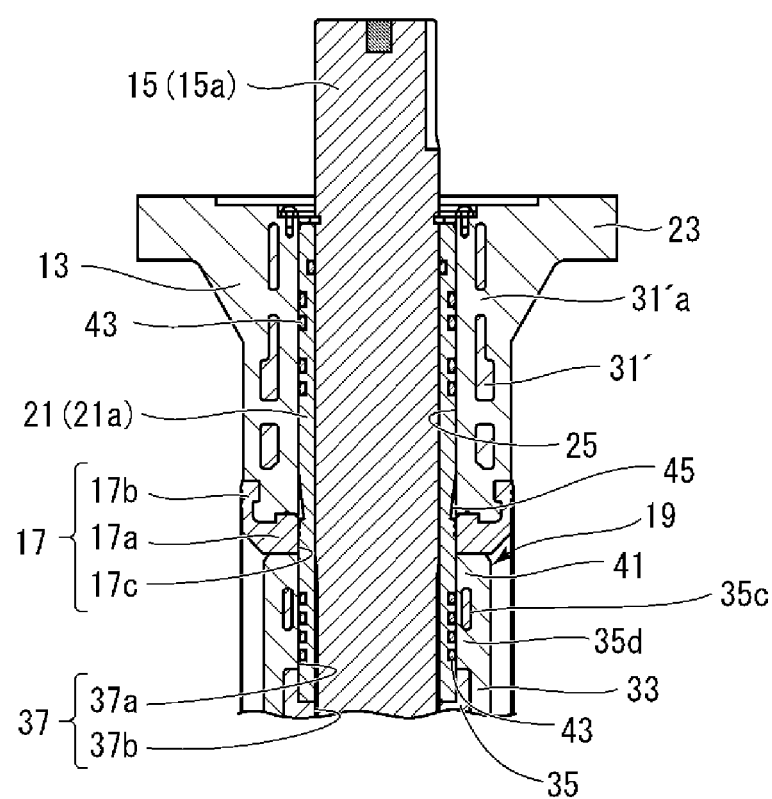
FIG. 5 is a partially enlarged cross-sectional view of a variation of the bearing portion of the valve body.
Figure 6:
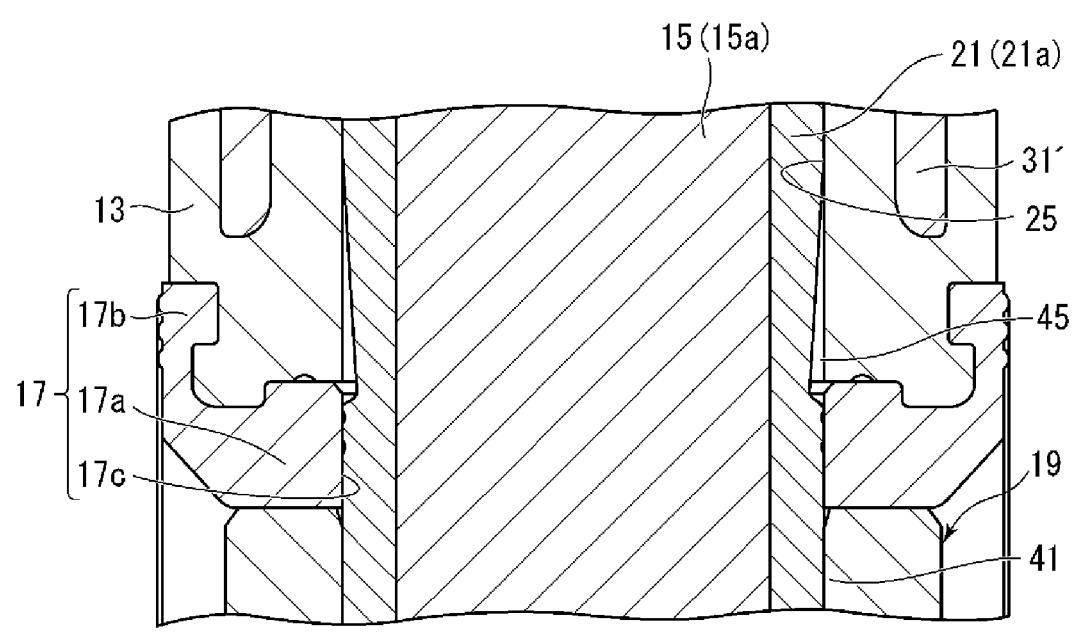
FIG. 6 is a partially enlarged cross-sectional view, showing, in enlarged scale, the vicinity of the opening of the variation of the bearing portion shown in FIG. 5.

FIGS. 5 and 6 shows a variation of the structure of the supporting portion where the valve body 13 supports the valve stem 15 in the butterfly valve 11 shown in FIG. 1. The configuration of the supporting portion where the valve body 13 supports valve stem 15 in this variation is different from the configuration of the supporting portion where the valve body 13 supports the valve stem 15 in the embodiment shown in FIGS. 3 and 4, in that: the cylindrical insert member 31' is provided with a plurality of through-holes 31'a extending from the inner peripheral surface to the outer peripheral surface; and the insert member 31', which extends to a position radially outward of a portion (neck portion 45) where an annular gap (space) is formed between the inner peripheral surface of the first bearing hole 25 and the outer peripheral surface of the first bushing 21a, is shorter and thinner than the insert member 31 in the embodiment shown in FIGS. 3 and 4, and is similar in other points to the configuration of the supporting portion where the valve body 13 supports the valve stem 15 in the embodiment shown in FIGS. 3 and 4. When the strength of the first bearing hole 25 is reinforced, the neck portion may be provided on the inner peripheral surface of the first bearing hole 25.

The through-hole 31'a of the insert member 31' functions as a passage for the synthetic resin material injected for forming the valve body 13 when injection molding is performed while placing the insert member 31' in a mold, thereby suppressing occurrence of injection molding failure. The insert member 31' may extend to a position radially outward of at least a portion of the gap space (neck portion formed between the inner peripheral surface of the first bearing hole 25 and the outer peripheral surface of the first bushing 21a in the direction of the rotation axis R, and the length and thickness of the insert member can be appropriately designed.

Note that while the first bearing hole 25, the first bushing 21a and their surroundings has been described above, the second bearing hole 27, the second bushing 21b and their surroundings also have a similar configuration.

Figure 7:
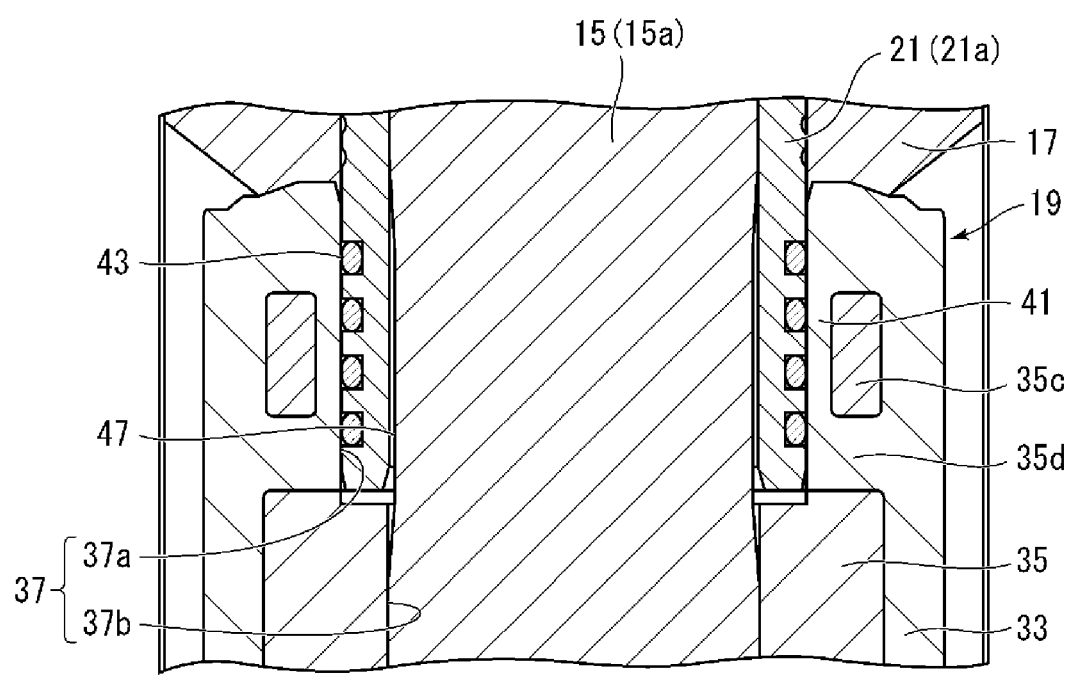
FIG. 7 is a partially enlarged cross-sectional view, showing, in enlarged scale, the vicinity of the opening of the valve-stem hole that connects the valve stem of the butterfly valve shown in FIG. 1 to the valve element, as taken along a section perpendicular to the section in FIG. 1.
Figure 8:
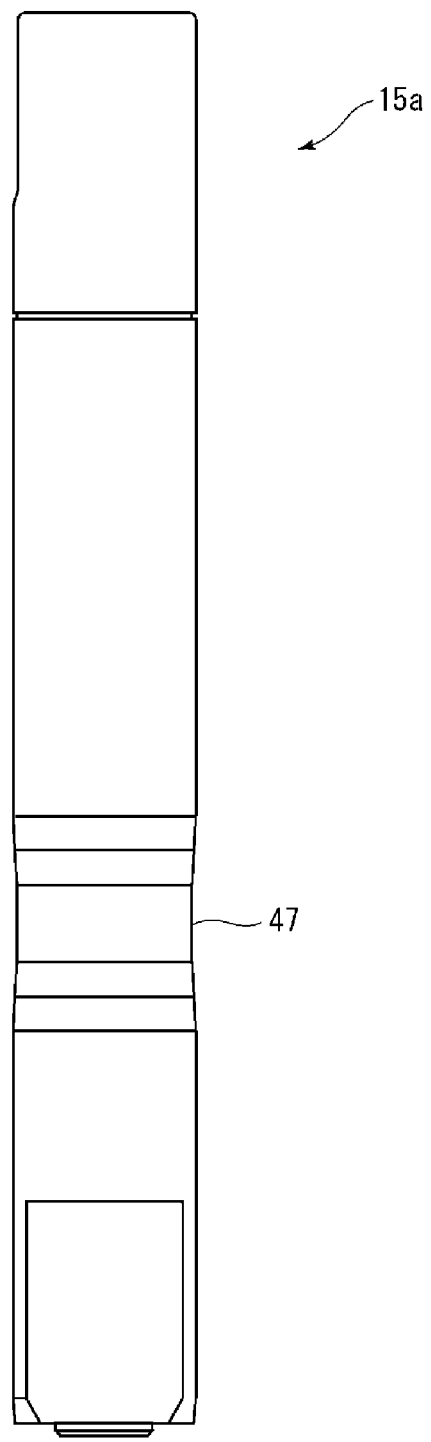
FIG. 8 is a side view, showing the valve stem of the butterfly valve shown in FIG. 1.

Next, referring to FIGS. 7 and 8, the details of the structure of the supporting portion where the valve element 19 supports the valve stem 15 in the butterfly valve 11 shown in FIG. 1 will be described.

In the butterfly valve 11, the first bushing 21a and the first valve stem 15a are configured to have shapes such that a gap (space) is formed between the inner peripheral surface of a portion of the first bushing 21a located radially inside the stem hole component 41 of the contour member 33 and the outer peripheral surface of a portion of the first valve stem 15a located radially inside the stem hole component 41 of the contour member 33. In the embodiment shown in FIG. 7, there is a gap formed between the inner peripheral surface of the first bushing 21a and the outer peripheral surface of the first valve stem 15a by providing a thickness reduction part on the outer peripheral surface of the portion of the first valve stem 15a which is located inside the stem hole component 41 of the contour member 33, so as to provide an annular neck portion extending circumferentially on the outer peripheral surface of the first valve stem 15a as shown in FIG. 8. However, a gap may be formed between the inner peripheral surface of the first bushing 21a and the outer peripheral surface of the first valve stem 15a by providing a thickness reduction part on the inner peripheral surface of the portion of the first bushing 21a located radially inside the stem hole component 41 of the contour member 33, so as to provide an annular neck portion 47 extending circumferentially on the inner peripheral surface of the first bushing 21a, and the method for forming a gap between the inner peripheral surface of the first bushing 21a and the outer peripheral surface of the first valve stem 15a is not particularly limited. Note here that when the first bushing 21a is forming of a resin material and the first valve stem 15a is formed of a metal material, the latter has a higher strength and therefore the neck portion 47 is preferably provided on the outer peripheral surface of the first valve stem 15a.

When the butterfly vale 11 is closed, fluid pressure acts on the valve element 19 to make the valve element 19 move to the secondary side (downstream), so that the first valve-stem hole 37 tries supporting shear stress and bending moment generated in the valve element 19 via the first bushing 21a. At this time, the reaction force from the first valve stem 15a supported in the first valve-stem hole 37 is transmitted to the inner peripheral surface of the first valve-stem hole 37 of the valve element 19. If the inner peripheral surface of the first bushing 21a is in contact with the outer peripheral surface of the first valve stem 15a in the first large-diameter hole portion 37a of the first valve-stem hole 37, the reaction force from the first valve stem 15a will be transmitted to the inner peripheral surface of the first large-diameter hole portion 37a of the first valve-stem hole 37 via the first bushing 21a. The inner peripheral surface of the first large-diameter hole portion 37a is formed by the stem hole component 41, and in particular, the peripheral portion of the opening to the outside of the stem hole component 41 is formed only of synthetic resin material because of the configuration in which the stem-hole reinforcement portion 35c of the core member 35 is covered with the contour member 33 of synthetic resin material so as not to come into contact with the liquid, (i.e., the stem-hole reinforcement portion 35c is spaced apart from the inner peripheral surface of the first large-diameter hole portion 37a and the outer peripheral surface of the valve element 19). As a result, the first large-diameter hole portion 37a of the first valve-stem hole 37 may fail to withstand the reaction force (shearing force and bending moment) transmitted from the first valve stem 15a via the first bushing 21a, and may be damaged. However, in the butterfly valve 11, there is a gap (space) formed between the inner peripheral surface of the portion located radially inside of the stem hole component 41 forming the first large-diameter hole portion 37a and the outer peripheral surface of the portion of the first valve stem 15a which is located radially inside the stem hole component 41, as described above. Therefore, even when fluid pressure acts on the valve element 19 in closing the valve so that bending moment is generated in the valve element 19, the gap between the outer peripheral surface of the first valve stem 15a and the inner peripheral surface of the first bushing 21a serves as an escape allowance in the first large-diameter hole portion 37a configured by the stem hole component 41, thereby avoiding a contact between the outer peripheral surface of the first valve stem 15a and the inner peripheral surface of the first bushing 21a and preventing transmission of force from the outer peripheral surface of the first valve stem 15a to the first bushing 21a, so that the force is not transmitted from the first bushing 21a to the stem hole component 41. As a result, the butterfly valve 11 can suppress breakage of the resin material portion (stem hole component 41) in the vicinity of the opening of the first valve-stem hole 37 of the valve element 19.

Preferably, the neck portion 47 is formed to extend over the entire region of the outer peripheral surface of a portion of the first valve stem 15a located inside the first large-diameter hole portion 37a configured by the stem hole component 41 (i.e., the outer periphery of the portion of the first valve stem 15a facing the region where the inner peripheral surface of the first valve-stem hole 37 and the outer peripheral surface of the first bushing 21a are in contact with each other in the stem hole component 41) along the rotation axis R. To enhance the strength of the stem hole component 41, it is preferable to make the thickness of the stem-hole reinforcement portion 35c of the core member 35 as large as possible.

If the size of the gap (space) between the outer peripheral surface of the first valve stem 15a and the inner peripheral surface of the first bushing 21a, that is, the depth of the neck portion 47, is too large, the displacement of the valve element 19 relative to the first valve stem 15a will become large, so that the sealability at the valve seat will deteriorate. Therefore, the gap or the amount of thickness reduction in the neck portion 47 is preferably adjusted to the extent that the force due to bending moment is not transmitted even if the valve element 19 is displaced in receiving pressure from the fluid.

Similarly, in the butterfly valve 11, the second valve stem 15b and the second bushing 21b also are configured to have shapes such that a gap (space) is formed between the inner peripheral surface of a portion of the second bushing 21b located radially inside the stem hole component 41 of the contour member 33 and the outer peripheral surface of a portion of the second valve stem 15b located radially inside the stem hole component 41 of the contour member 33. The configuration and action of the second valve stem 15b, the second bushing 21b, the second valve-stem hole 39 and their surroundings are similar to the configuration and action of the first valve stem 15a, the first bushing 21a, the first valve-stem hole 37 and their surroundings described above, and the descriptions thereof are omitted here.

While the butterfly valve 11 according to the present invention has been described above with reference to the embodiments shown in the figures, the present invention is not limited to the shown embodiments. For example, in the shown embodiment, the insert members 31, 31 are provided around the first bearing hole 25 and the second bearing hole 27, and the stem-hole reinforcement portions 35c, 35c are provided around the first valve-stem hole 37 and the second valve-stem hole 39. However, these are not essential components and may be omitted.

DESCRIPTION OF REFERENCE NUMERALS 11 butterfly valve
13 valve body
13a internal flow passage
15 valve stem
15a first valve stem
15b second valve stem
19 valve element
21 bushing
21a first bushing
21b second bushing
25 first bearing hole
27 second bearing hole
31 insert member
31' insert member
33 contour member
35 core member
37 first valve-stem hole
39 second valve-stem hole
41 stem hole component
45 neck portion
47 neck portion

The invention claimed is:

1. A butterfly valve comprising
a valve body formed therein with an internal flow passage,
a valve stem rotatably supported by the valve body,
a valve element placed in the internal flow passage and supported by the valve body via the valve stem to be rotatable about a rotation axis, and
a bushing externally fitted around the valve stem, wherein
the valve element is configured by a core member and a contour member,
said contour member formed of a resin material and surrounding the core member to define a contour of the valve element, and
said valve element formed with a valve-stem hole that supports at least a part of the valve stem via the bushing;
the contour member has a stem hole component forming at least a portion of an inner peripheral surface of the valve-stem hole; and
a gap is formed over an entire region of the stem hole component along the rotation axis between an inner peripheral surface of a portion of the bushing located inside the stem hole component and an outer peripheral surface of a portion of the valve stem located inside the stem hole component.

2. The butterfly valve according to claim 1, wherein
there is an annular neck portion provided on an outer periphery of the portion of the valve stem located inside the stem hole component, and
the gap between the inner peripheral surface of the bushing and the outer peripheral surface of the valve stem is formed in the stem hole component by the annular neck portion.

3. The butterfly valve according to claim 2, wherein
the annular neck portion is formed to extend over an entire region of the outer periphery of the portion of the valve stem along the rotation axis, said portion of the valve stem facing a region where the inner peripheral surface of the valve-stem hole and the outer peripheral surface of the bushing are in contact with each other in the stem hole component.

4. The butterfly valve according to claim 1, wherein
the core member includes tubular stem-hole reinforcement portions at both ends in a direction of the rotation axis, and
each of the tubular stem-hole reinforcement portions is spaced apart from the inner peripheral surface of the valve-stem hole of the stem hole component so as to surround the valve-stem hole.

* * * * *